United States Patent [19]

Clonch et al.

[11] Patent Number: 5,855,467
[45] Date of Patent: Jan. 5, 1999

[54] PIVOT LOCKING DEVICE

[75] Inventors: David M. Clonch, Beckley, W. Va.; Fred D. Boyd, Pounding Mill; Michael J. Cook, Lebanon, both of Va.

[73] Assignee: Long-Airdox Company, Blacksburg, Va.

[21] Appl. No.: 781,034

[22] Filed: Jan. 8, 1997

Related U.S. Application Data

[63] Continuation-in-part of Ser. No. 309,225, Sep. 20, 1994, Pat. No. 5,664,932.

[51] Int. Cl.$^6$ ....................................................... B66C 1/00
[52] U.S. Cl. .............................................. 414/680; 180/68.5
[58] Field of Search ...................... 414/664–666, 414/668–670, 546, 680; 180/68.5; 104/34

[56] References Cited

U.S. PATENT DOCUMENTS

| | | | |
|---|---|---|---|
| 3,360,143 | 12/1967 | Allen | 214/317 |
| 3,734,329 | 5/1973 | Grelick | 214/750 |
| 3,834,563 | 9/1974 | Teti | 104/34 |
| 3,966,064 | 6/1976 | Felburn . | |
| 4,065,013 | 12/1977 | Orthman | 214/620 |
| 4,065,015 | 12/1977 | Radakovich | 214/750 |
| 4,167,366 | 9/1979 | DeVivo | 414/697 |
| 4,397,365 | 8/1983 | Harbe et al. | 180/68.5 |
| 4,402,645 | 9/1983 | Broderick et al. | 414/685 |
| 4,527,942 | 7/1985 | Smith | 414/665 X |
| 4,538,953 | 9/1985 | Abramson, Jr. | 414/608 |
| 4,547,118 | 10/1985 | Pittenger | 414/408 |
| 4,692,085 | 9/1987 | Parsons . | |
| 5,040,815 | 8/1991 | Evans | 280/425.2 |
| 5,098,251 | 3/1992 | Kress et al. | 414/546 X |
| 5,163,537 | 11/1992 | Radev | 187/9 R |
| 5,226,777 | 7/1993 | Radev | 414/708 |
| 5,238,357 | 8/1993 | Patrick et al. | 414/420 |
| 5,256,023 | 10/1993 | Patrick et al. | 414/420 |
| 5,275,525 | 1/1994 | Grumblatt | 180/68.5 |
| 5,618,152 | 4/1997 | Andrews | 414/546 |

FOREIGN PATENT DOCUMENTS

| | | |
|---|---|---|
| 0192994A1 | 1/1986 | European Pat. Off. . |
| 1107883 | 10/1964 | United Kingdom . |
| 2254309 | 2/1992 | United Kingdom . |
| 2255755 | 4/1992 | United Kingdom . |
| 2263452 | 1/1993 | United Kingdom . |

Primary Examiner—Donald W. Underwood
Attorney, Agent, or Firm—Rudnick & Wolfe

[57] ABSTRACT

The present invention is directed to a pivoted lifting device having a main support frame selectively pivotable about a horizontal axis and engagement arms connected to the main support frame by a pivot pin. The engagement arms include an engagement surface. The pivoted lifting device allows the entire engagement surface to contact an article prior to the article being moved from an at rest position. The invention includes hydraulically actuated spring biased shaft having an unlocked position and also a locked position wherein it is located adjacent the engagement arms to lock the engagement arms in an upright position.

14 Claims, 9 Drawing Sheets

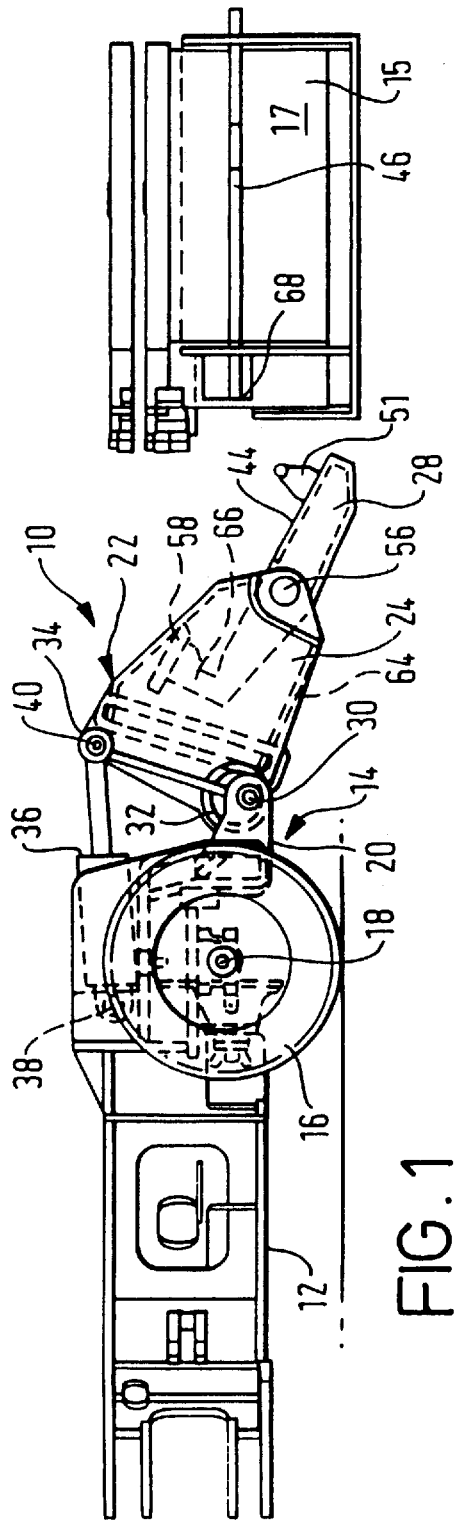
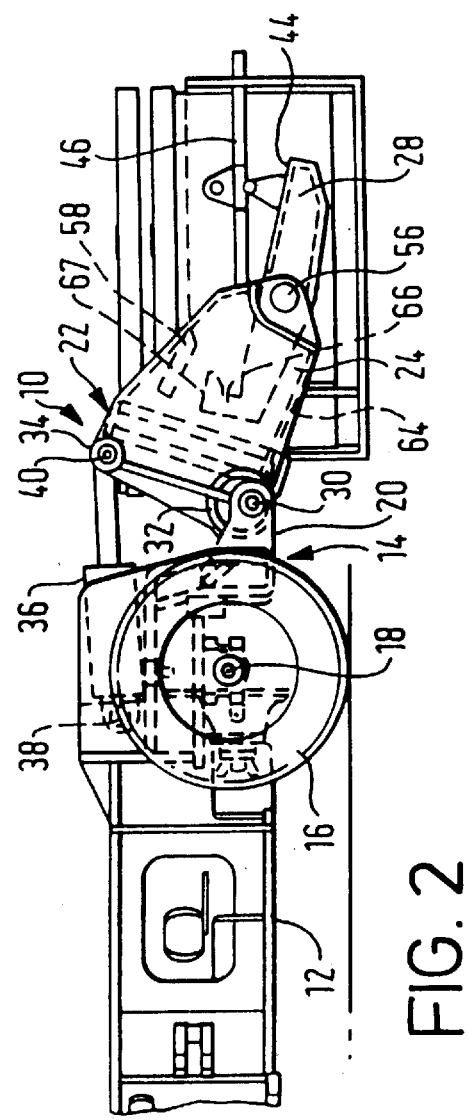
FIG. 1
FIG. 2

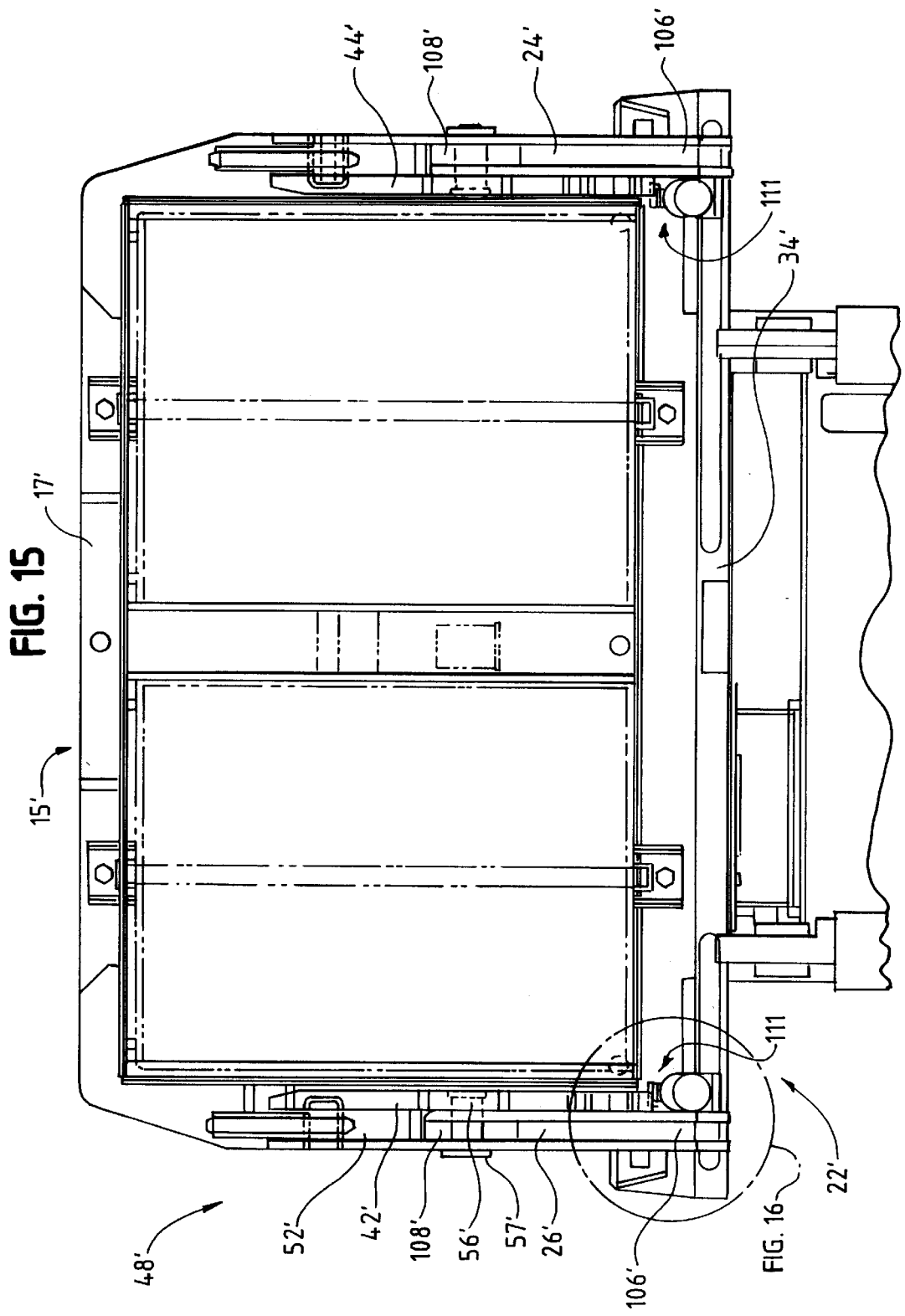

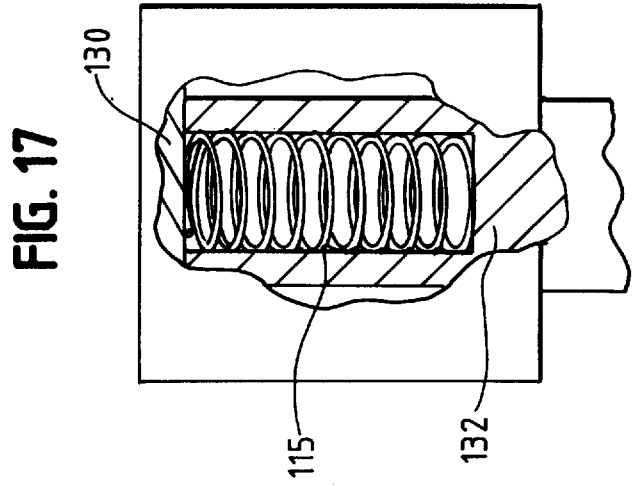
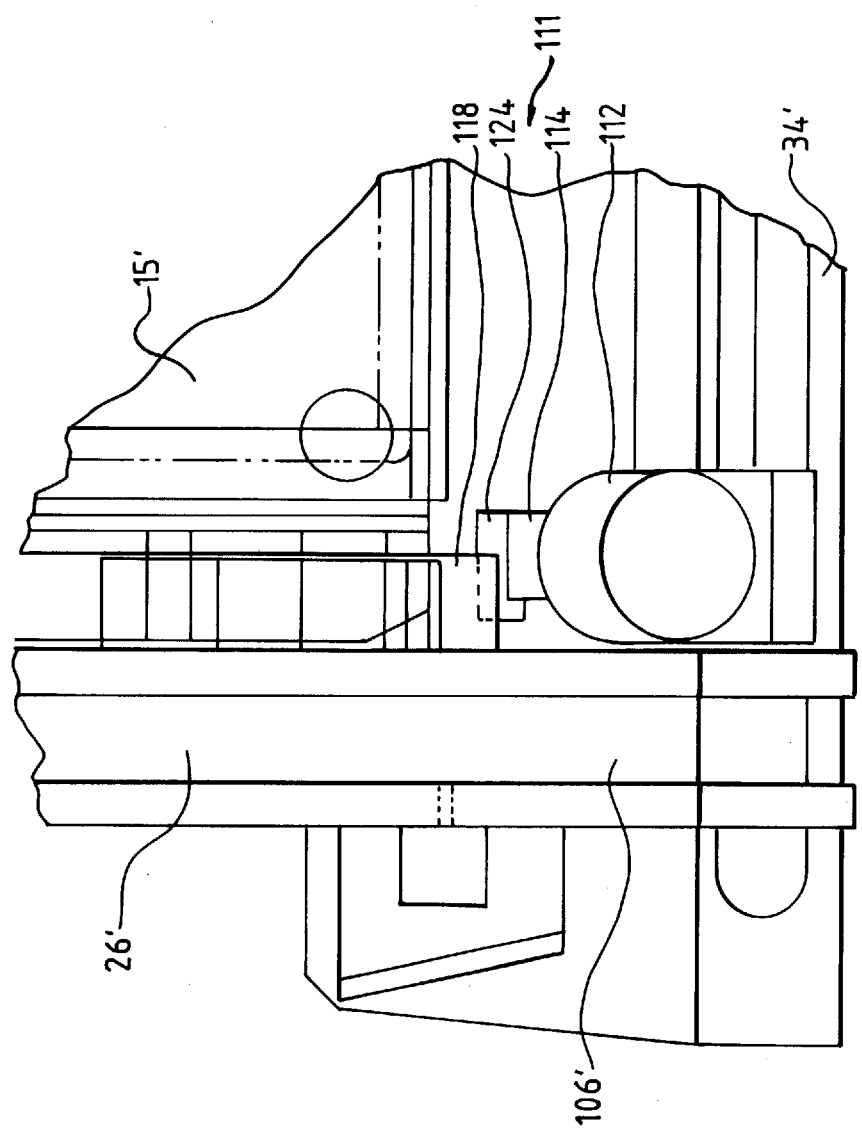

PIVOT LOCKING DEVICE

This is a continuation-in-part of application Ser. No. 309,225 filed Sep. 20, 1994, now U.S. Pat. No. 5,664,932.

FIELD OF THE INVENTION

The present invention relates generally to a pivot locking device for a pivoted lifting device for vehicles, and more particularly to a locking device for a pivoted lifting device for a battery changing system for electrically powered underground mining vehicles having a main vehicle frame and a battery support attached to the main vehicle frame.

BACKGROUND OF THE INVENTION

Low profile mining vehicles such as scoops, haulers, equipment movers and the like, powered by electric batteries are well known in the art. With present technology, a fully charged battery is capable of powering such a vehicle for the duration of one working shift or slightly in excess of eight hours. It generally requires approximately eight hours to fully recharge one of these batteries. In addition, it is usually recommended to allow the newly charged battery to "cool" for a period of approximately eight hours to improve the batteries performance. Since it is desirable to use the mining vehicles for more than one shift in a 24 hour period, the batteries in the vehicle must be changed after every shift.

It is therefore expedient to be able to quickly and efficiently change a battery on the mining vehicle so that the vehicle may return to productive use rather than remaining idle. The batteries in these types of vehicles are bulky and heavy, some having a weight in the range of several thousand pounds. As a result, the batteries are not easily removed from or added to the vehicles without assistance from a powerized lifting mechanism.

Usually, the electric battery of an underground mining vehicle is arranged in a heavy steel-plate battery tray located at the rear section of the mining vehicle for acting as a counterweight to the useful load which is normally supported by the front section of the vehicle. The battery tray protects the battery against physical damage during the operation of the vehicle as well as during the changing of the battery. However, if the battery case itself is strong enough to protect the battery, then a separate battery tray may not be necessary or the battery case will be supported by a lifting mechanism located on the vehicle. Since different arrangements of the battery may be employed, for simplicity of the description, the term "battery" should be understood to designate the whole exchangeable battery set, including the battery tray, if the battery is arranged in such a tray.

During operation of the mining vehicles or similar vehicles, the battery is supported by the vehicle and connected thereto for providing the power necessary to operate the vehicle. It has been the common practice in the art to include a battery changing system on the vehicle to load and unload batteries from the vehicle. This task has generally been accomplished through the use of hydraulically powered lifting systems for vertically moving the battery during battery changing operations. The combination of the vertical motion of the battery provided by the battery changing system and the horizontal motion of the vehicle itself, enables the operator to unload the drained battery from the vehicle onto a stand or the floor of a battery changing station and to load a fresh or recharged battery from the battery changing station onto the vehicle.

There are generally two different types of battery changing systems which are well known in the art. In the first type, the battery lays on the bottom plate of the vehicle main frame, which bottom plate is uninterrupted or cut in a "u" shape. Two rigid vertical hydraulic cylinders, acting upon horizontal brackets on the left and right sides of the battery, move the battery up and down during a battery changing operation. The major disadvantage of this first type of battery changing system is that the battery cannot be moved in a position lower than its normal position on top of the vehicle bottom plate.

In the second type of battery changing system, the battery is loaded on and secured to a battery support, such as a fork or a platform or a "U" shaped structure. This battery support under the action of a vertical hydraulic cylinder, moves up and down during a battery changing operation. The battery support is guided to move in the vertical direction by two parallel members attached firmly to the main frame of the vehicle. This second type of battery changing system is similar to the well known load-lifting system of a fork lift truck. The major disadvantages of this second type battery changing system are: first, the vertical travel of the battery is very short because the lengths of the vertical hydraulic cylinders and parallel guides are limited by the height of the vehicle main frame, and second, the parallel guides of the battery support are complicated and unreliable because it is difficult to keep them clean in an underground environment.

A further problem associated with the previous apparatus for lifting the battery onto the vehicle is the tendency for the battery to be pushed along the floor or against a wall in order to get the lifting arms of the battery changer underneath the lifting edge of the battery. This significantly increases the possibility of damaging the battery and the support structure in the mine during a battery changing operation.

A further problem to be avoided is the instability of the lifting apparatus. Particularly, the movement of the vehicle with the battery, may generate a vibration within the apparatus, thereby creating stress in the apparatus and vehicle.

SUMMARY OF THE INVENTION

The present invention overcomes the deficiencies of the prior art by providing a novel and unique battery changing system.

The present invention therefore provides a lifting device for carrying a power source, comprising means for supporting said power source, means for engaging with said power source, said engaging means pivotally coupled to said supporting means, means for limiting the extent of rotation of said engaging means in one direction, with respect to said supporting means, to define a limit position, and means for locking the engaging means at the limit position.

The battery changing system of the present invention is also provided with a lifting device incorporating a pivot positioned on the battery changing system to allow a portion of the lifting device to align with the lifting ledge of the battery without the necessity for sliding or tipping the battery. The present invention includes a rigid support frame pivotably connected at its lower end to a low profile vehicle. A pair of hydraulic cylinders rigidly mounted to an upper portion of the vehicle and to the upper end of the support frame allows the support frame to be pivoted about its lower end adjacent the vehicle. The support frame is provided with lift arms spaced apart on either side of the frame for contacting the lifting ledge of the battery. The lift arms are connected to the frame by a pivot pin, which allows the lift arms to fully engage the lifting surface of the battery initially without supplying any significant upward force even when the support frame is angled below horizontal. The present invention allows the battery to be lifted in a substantially vertical direction without any sliding of the battery along the floor, or a requirement that the battery be braced against the wall. It also prevents one end of the battery from being dropped when it is being unloaded from the vehicle.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is side elevational view of the lifting device of the present invention attached to the rearward end of a low profile mining vehicle illustrated disconnected from a battery;

FIG. 2 is a side elevational view of the invention of FIG. 1 illustrating the battery support frame disposed at an angle below horizontal and the battery lift arms initially engaging the lifting ledge of the battery;

FIG. 15 is a top plan view of the battery and lifting device of the present invention with the locking device in the locked position;

FIG. 16 is an enlargement of view A of FIG. 15; and

FIG. 17 is a partial cross-section of the cylinder of the pivot locking device.

DETAILED DESCRIPTION OF THE INVENTION

Figure 3:
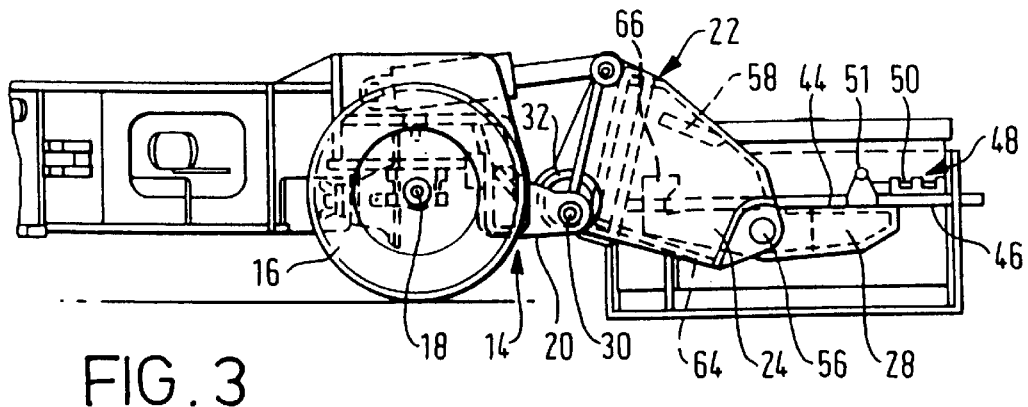
FIG. 3 is a side elevational view of the invention of FIG. 1, continuing the lifting operation of FIG. 2 and illustrating the lifting arm in flush engagement with the lifting ledge of the battery.
Figure 4:
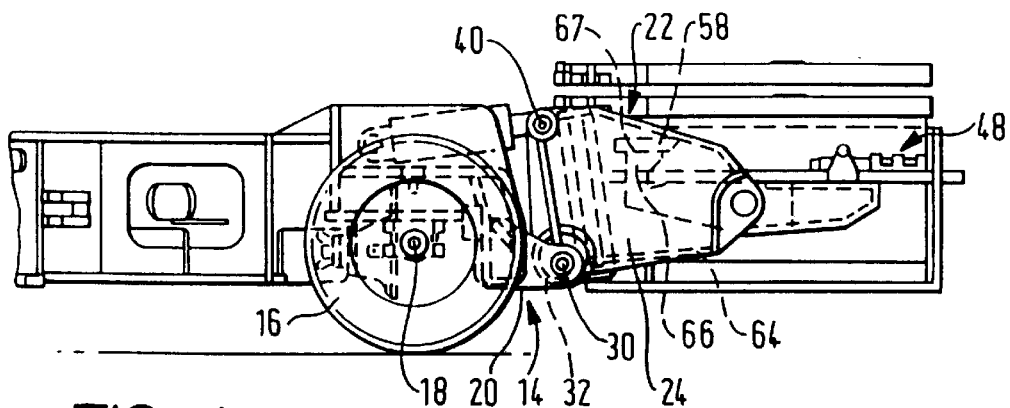
FIG. 4 is a side elevational view of the invention of FIG. 1 illustrating the battery position above the ground and locked in place on the vehicle and disposed in an orientation parallel to the ground.

Referring to the drawings, and particularly FIGS. 1 and 2, the pivoted lifting device of the present invention is illustrated and identified generally at 10. The pivoted lifting device 10 is part of a battery changing system for a low profile mining vehicle 12 such as a scoop, hauler equipment movers and the like. However, the description with respect to the battery changing system is merely exemplary as the device may be utilized to pick up a variety of other articles. The battery 15 is of a well known type generally surrounded by a protective case 17 and including an engagement area 46 that may take the form of a ledge or pins. The rearward end 14 of the low profile mining vehicle 12 as illustrated in FIG. 1 includes rear wheels 16 and axle 18 connected to main body frame 20.

Figure 7:
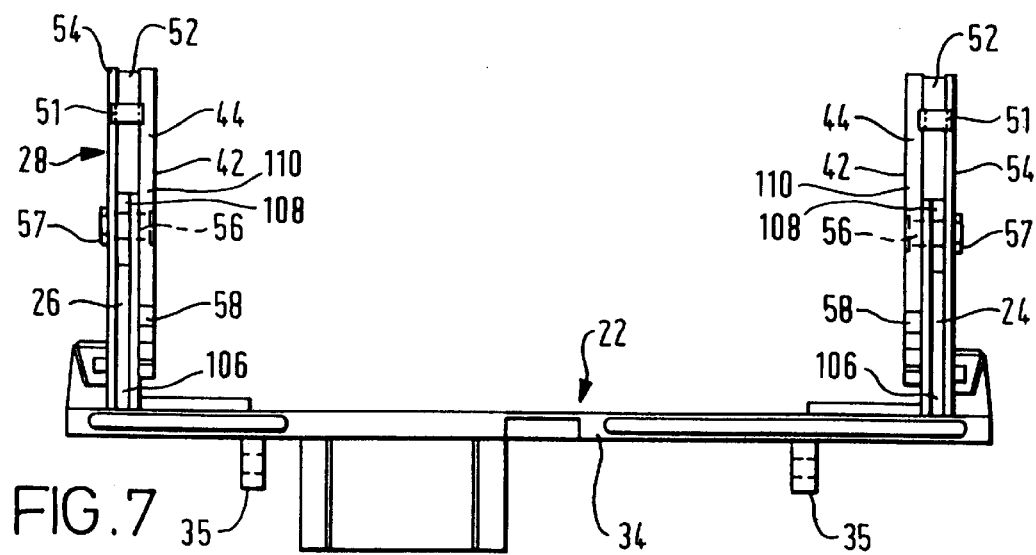
FIG. 7 is a top plan view of the pivoted lifting device of the present invention.
Figure 8:
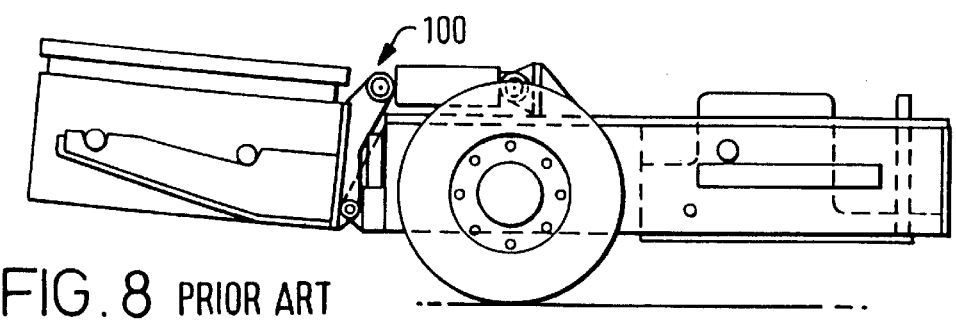
FIGS. 8–11 are a series of side elevational views of a prior art lifting device illustrating the operation of lifting or lowering a battery from a vehicle.
Figure 9:
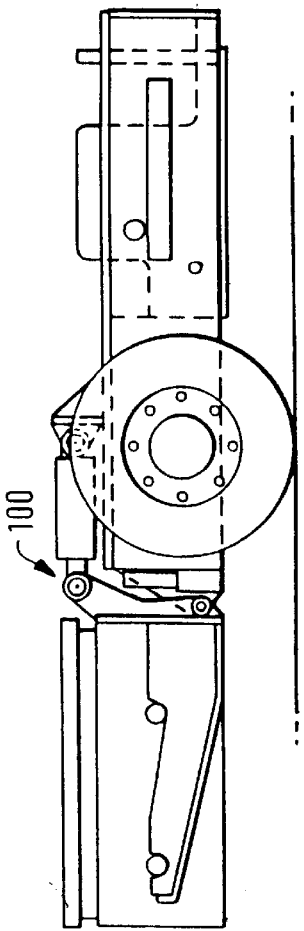
Figure 10:
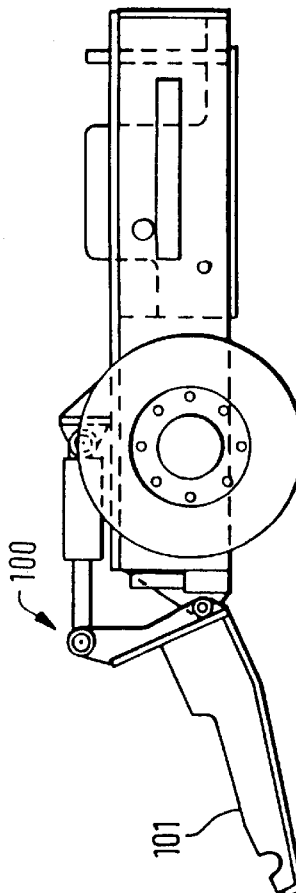
Figure 11:
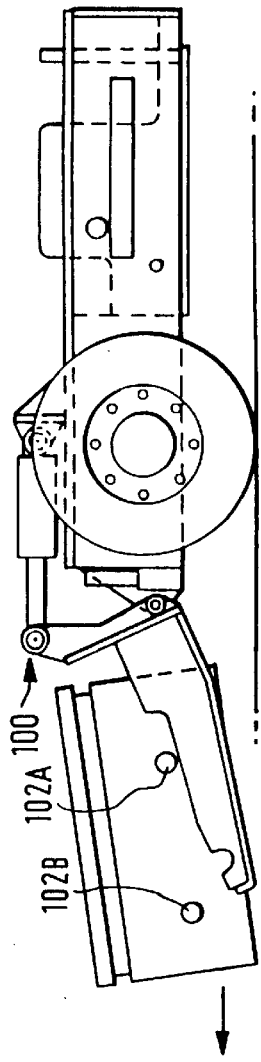

As shown more clearly in FIG. 7, the pivoted lifting device 10 includes generally "U" shaped battery support frame 22, including spaced apart main battery support arms 24 and 26. Battery support arms 24 and 26 may be a series of steel plates welded together and connected at their rearward lower ends to pivot rod 30 and at their upper rearward corner by structural support member 34. Alternatively, support arms 24 and 26 may be cast as uniform structural members. The support arms 24, 26 include one end 106 and another end 108. The pivoted lifting device 10 further includes a pair of battery lift arms 28, each pivotally connected to main body arms 24 and 26 respectively.

Referring again to FIGS. 1–5, battery support frame 22 is hingedly connected to the rearward end 14 of vehicle 12 by a pivot rod 30 extending through structural tubing 32. Structural tubing 32 is connected to a lower portion of the vehicle frame 20, preferably by welding. Alternatively, as illustrated in FIG. 7, a pair of lugs 35 welded to a portion of the frame support 22 are adapted to receive pivot pins (not shown) to hingedly connect the frame support 22 to vehicle.

A pair of identical hydraulic cylinders 36 are rigidly mounted to the vehicle by cylinder pins 38 and pivotably mounted to structural support member 34 by rod end pins 40. The cylinders 36 selectively extend and retract to rotate battery support frame 22 about pivot rod 30 during battery changing operations. Alternatively, any motor capable of supply a drive force to the battery support frame may be used.

Figure 6:
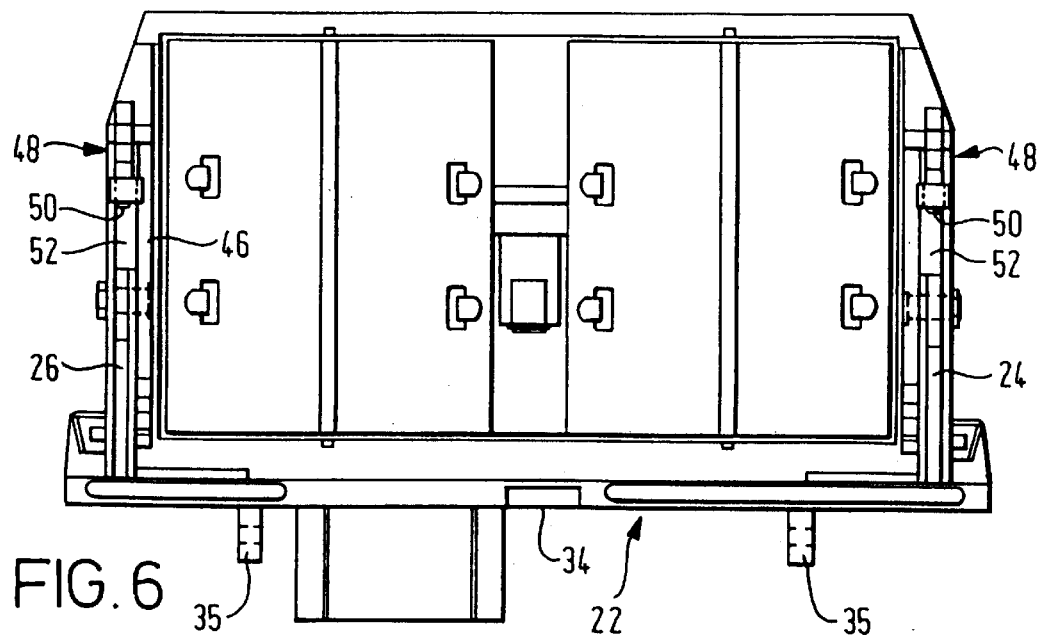
FIG. 6 is a top plan view of the pivoted lifting device of the present invention illustrating the lift arms engaged to a battery.

A pair of freely pivotable battery lift arms 28 are connected to the battery support arms 24 and 26 at pivot pin 56. As shown in FIGS. 6 and 7 battery lift arms 28 include three interconnected plates including an interior portion 42, an intermediate portion 52 and exterior portion 54. The three plates are preferably interconnected by welding. Alternatively, battery lift arms 28 may be cast as an integral structural member. The lift arms 28 include a midsection 110.

The interior portion 42 of battery lift arms 28 includes a flat battery engagement surface 44 for engaging the underside of a battery lifting ledge 46 (see FIG. 1–5). The lifting ledge 46 provide an easily accessible point of contact between the battery and the lifting device.

A latching mechanism 48 of a type well known in the art, such as for example a steel plate 51 adapted to receive a pin is mounted on the distal end of battery lift arms 28. The latch mechanism 48 is adapted to receive a sliding pin 50 mounted on the battery case 17 for securely attaching the battery 15 to the battery lift arms 28. The latch pin receiving mechanism 51 is spaced outwardly from the interior portion 42 of the battery lift arm 28 and is placed over an intermediate portion 52 of the battery lift arms 28. The latching mechanism may alternatively take the form of a biased locking mechanism of a type well known in the art that automatically latches when the lift arm engagement surface 44 is flush against the lifting ledge 46.

An exterior portion 54 of the battery lift arm 28 is adjacent the intermediate portion to provide additional strength to the battery lift arm 28 and provide additional surface area outwardly from the lifting ledge 46 for mounting the latching mechanism 48 as illustrated in FIG. 7.

The battery lift arms 28 are connected to the main battery support arms 24 and 26 by pin 56 which extends horizontally through the exterior portion 54 of the battery lift arms 28, the main battery support arms 24 and 26 and the interior portion 42 of the battery lift arms 28. The pin 56 is secured in place by nut 57. The battery lift arms 28 have a predetermined weight distribution so that the arms 28 will attempt to rotate clockwise when able to freely pivot about pin 56.

Interior portion 42 of battery lift arms 28 includes a catch 66 or a hooked portion that engages the front edge 68 of the battery lift ledge 46. The catch 66 insures that the battery 15 is properly positioned on the pivoted lifting device 10 and also insures that the latching mechanism 48 will be aligned to receive the sliding pin 50 for securely connecting the battery 15 to the pivoted lifting device 10. The top surface 67 of catch 66 act as a striking surface and engages stop plate 58 to prevent rotation of the battery lift arms 28 in the clockwise direction as viewed in FIGS. 1–5 beyond a desired orientation. A separate stop plate 58 is preferably welded to each battery support arm 24 and 26. For example, the battery engagement surface 44 of battery lift arms 28 may only be rotated clockwise to a position substantially parallel with the surface of stop plate 58. The stop plate 58 does not prevent rotation of the battery lift arms 28 in the counter clockwise direction as viewed in FIG. 1 since the arms 28 are designed to have a rotating movement causing the arms to rotate clockwise.

Figure 5:
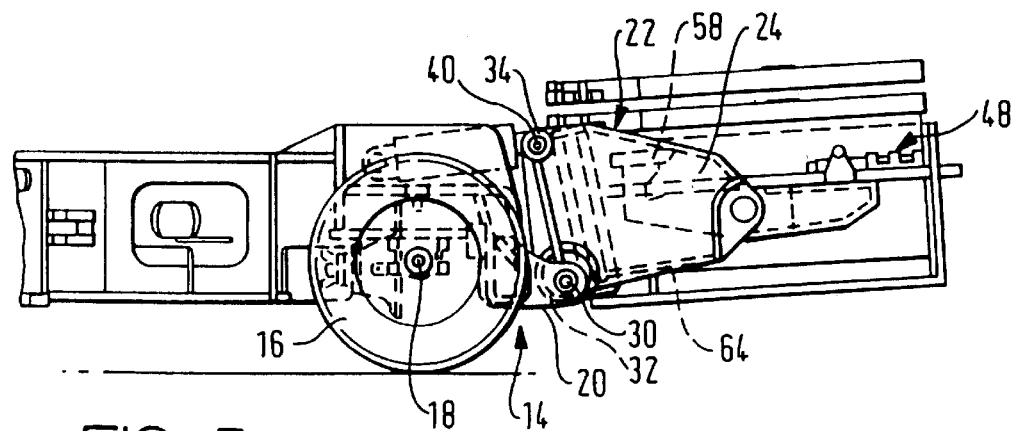
FIG. 5 is a side elevational view of the invention of FIG. 1 illustrating the battery locked in place on the vehicle and tilted above a horizontal orientation.

As shown in the series of illustrations in FIGS. 1–5, the present invention allows a battery 15 to be changed on a low profile mining vehicle with out causing damage to the battery or the walls or structure within the mine. In operation, the rearward end 14 of the mining vehicle 12 is guided toward a battery 15 positioned on the ground. The pair of hydraulic cylinders 36 are extended causing the main battery support frame 22 and the main battery support arms 24 and 26 to be rotated about the pivot rod 30 from its generally upright position and be disposed in a generally downwardly pointed direction. It should be understood that the upright position of the support frame 22 may be tilted from a vertical position toward the vehicle. That upright position as illustrated in FIG. 5, keeps the rearward edge of the battery from dragging on the ground when for example, there is a lump in the surface that the vehicle is riding on and similarly prevent the upper front edge of the battery from striking similar protrusions from the mine roof. The battery lift arms 28 are freely pivotable on the main support arms 24 and 26 at this point. Due to its uneven weight distribution, the engagement surface 44 is disposed in an orientation clockwise from horizontal. Alternatively, arm 28 may be biased by a spring mechanism to an orientation clockwise from horizontal. As the vehicle approaches the battery 15, the battery engagement surface 44 of the interior portion 42 of battery lift arm 28 engages the front edge 68 of the battery lifting ledge 46. It is preferred that the portion of the battery engagement surface 44 that is initially contacted by the front edge 68 be the portion of the engagement surface between the pivot pin 56 and the catch 66 of the battery lift arm 28. Because the lift arm 28 is freely rotatable, the initial contact with the battery provides virtually no resistive force or upward force on the battery. Rather, the front edge 68 of the battery lifting ledge 46 slides along the battery engagement surface 44, deflecting the portion of the lift arm 28 between the pivot pin 56 and the catch 66 downwardly or counter clockwise as viewed in FIG. 2. Thus, the battery 15 is not lifted off of the ground nor is it caused to slide along the ground since little or no force is acting upwardly on the battery. This lifting off of the ground of the battery and wedging the lower rearward edge of the battery into the ground is a common deficiency found in the prior art and is illustrated in FIGS. 8–11. As illustrated in FIGS. 8–11, prior art lifting devices 100 utilized a ramped surface 101 on the lift arms to engage rollers 102 disposed on the battery. In order for the front roller 102A to ride up the ramp, the lateral force is provided by moving the vehicle forward. However, this had a tendency to slide the battery along the floor until the battery was braced against a wall or the lower rearward edge of the battery dug into the ground to counteract the sliding lateral force supplied by the vehicle.

In the present invention, when the front end 68 of the battery lifting ledge 46 reaches and engages the catch 66, the battery engagement surface 44 should be deflected into flush engagement with the underside of battery lifting ledge 46. At this point, the battery latch 48 may be attached manually or automatically to securely connect the battery to the pivoted lifting and support device.

The operator can then retract the cylinders 36 to begin rotation of the main support frame 22 to its upright position. While this is occurring, the engagement surface 44 of the battery lift arms 28 are maintained flush with the lifting ledge 46 due to the relative rotation between the battery lift arms 28 and the main support arms 24 and 26 caused by the connection through pin 56. The relative rotation continues until striking surface 67 engages the stop plate 58 of the main battery support arms 24 and 26 preventing further relative rotation between the main support arm and the battery lift arms. During this period of rotation, the battery engagement surface 44 is maintained in flush contact with the battery lifting ledge 46 and the movement of the battery is substantially in the vertical direction. The end of the relative rotation between the support arms 24 and 26 and the battery engagement arms 28 will preferably occur when the lower edge 64 of the main support arms is substantially parallel to the battery lifting ledge 46.

The reverse of the operation described above would be utilized in order to remove a drained battery from the low profile vehicle.

FIGS. 12–16 disclose the lifting device with the pivot locking device of the present invention. The lifting device shown in FIGS. 12–16 include like features shown in the embodiment of FIGS. 1–7 and therefore the same reference numerals are used with a prime notation where the elements are substantially identical.

Figure 12:
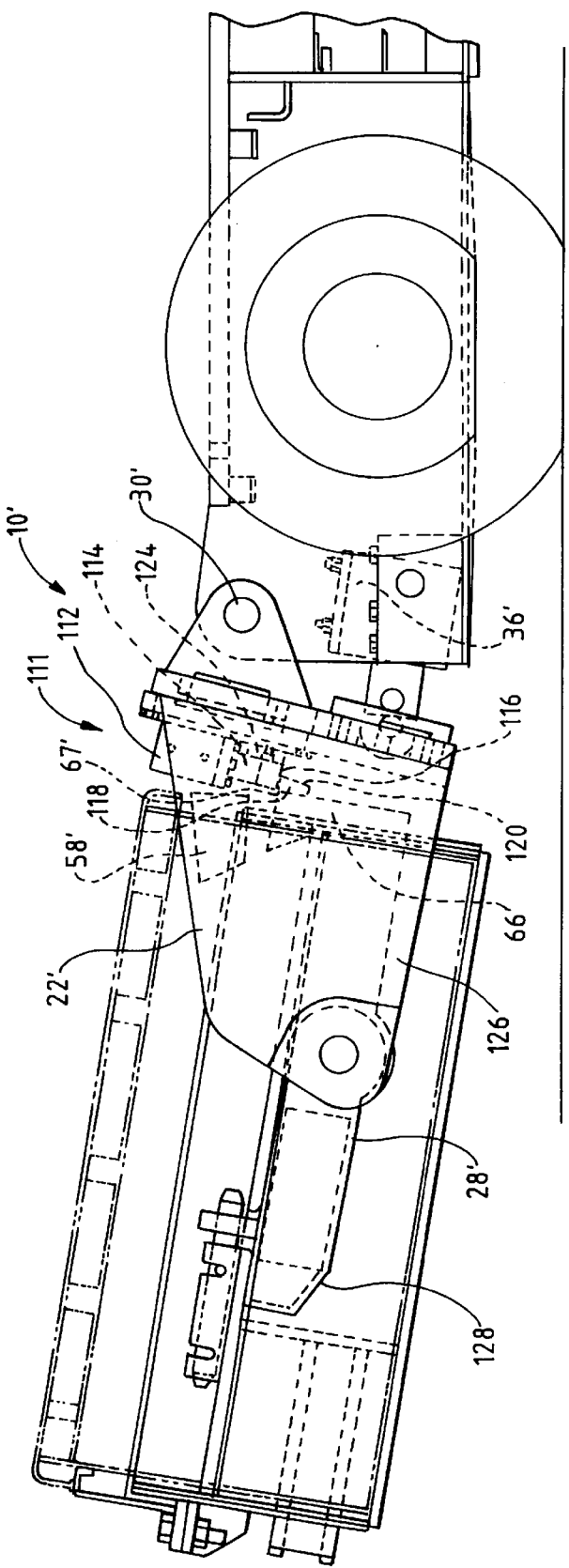
FIG. 12 is a side elevational view of the lifting device with the pivot locking device of the present invention attached to the rearward end of a low profile mining vehicle illustrated lifting the battery upward and with the locking device in the locked or armed position.

Turning to FIG. 12, the pivoted lifting device 10' is shown to include the pivot locking device 111. The pivot locking device 111 includes a spring biased hydraulically operated cylinder 112 which includes a cylinder shaft 114. The cylinder 112 is secured to the battery support frame 22'. The cylinder 112 includes a spring 115 (FIG. 17) which exerts a constant force on the shaft 114, urging the shaft outwardly in the locked or armed position shown in FIG. 12. The cylinder shaft 114 includes an end 116 which faces downwardly. The cylinder 112 includes a hydraulic system (not shown) capable of directing the shaft 114 towards the cylinder 112 against the force of the spring. The hydraulic system may be controlled by an operator.

FIG. 12 further shows the battery lift arm 28' which includes the catch or hook portion 66' having the top surface 67'. Extending from the hooked portion 66' is shown a shoulder 118 having an outwardly facing and inclined contact surface 120 and an edge 122 (see FIG. 14) facing substantially upwardly. The upward facing edge 122 is shown to be contact with the end 116 of the shaft 114. An abutment 124 is shown secured to the battery support frame 22' and in engagement with the shaft 114. The battery lift arm 28' further includes a first end 126 and a second end 128.

It is further noted that the top surface 67' of the battery lift arm 28' is shown in a spaced apart relation from the stop plate 58'.

Figure 13:
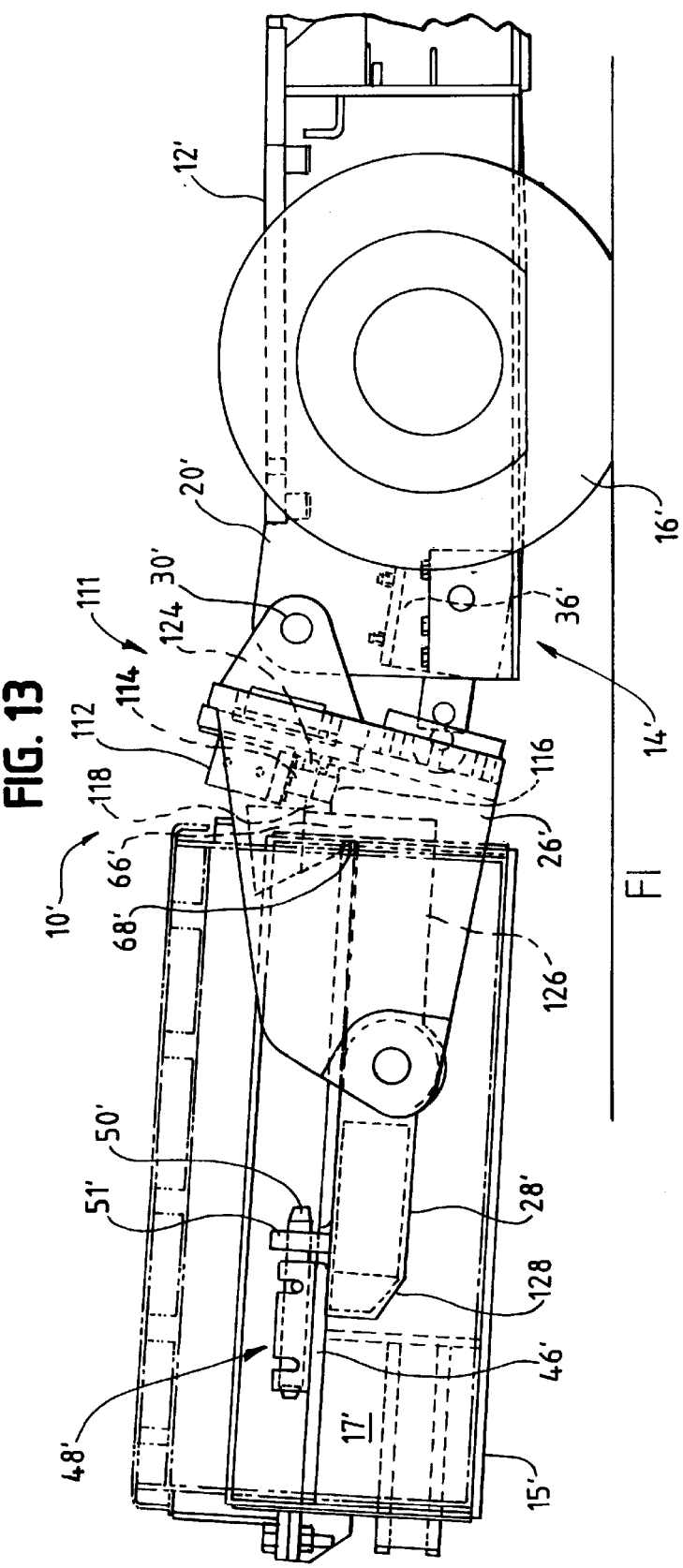
FIG. 13 is a side elevational view of the invention of FIG. 12 illustrating the battery lift arms in an upright operating position and the locking device in a locked or armed position.

FIG. 13 shows the pivot locking device 111 with the shaft 114 in the locked or armed position. The shaft 114 is shown extending between the contact surface 120 of the shoulder 118 and the abutment 124 of the battery support frame 22'. The top surface 66' of the battery lift arm 28 is shown in contact with the stop plate 58'. The pivoted lifting device 10' is shown in the upright operating position.

Figure 14:
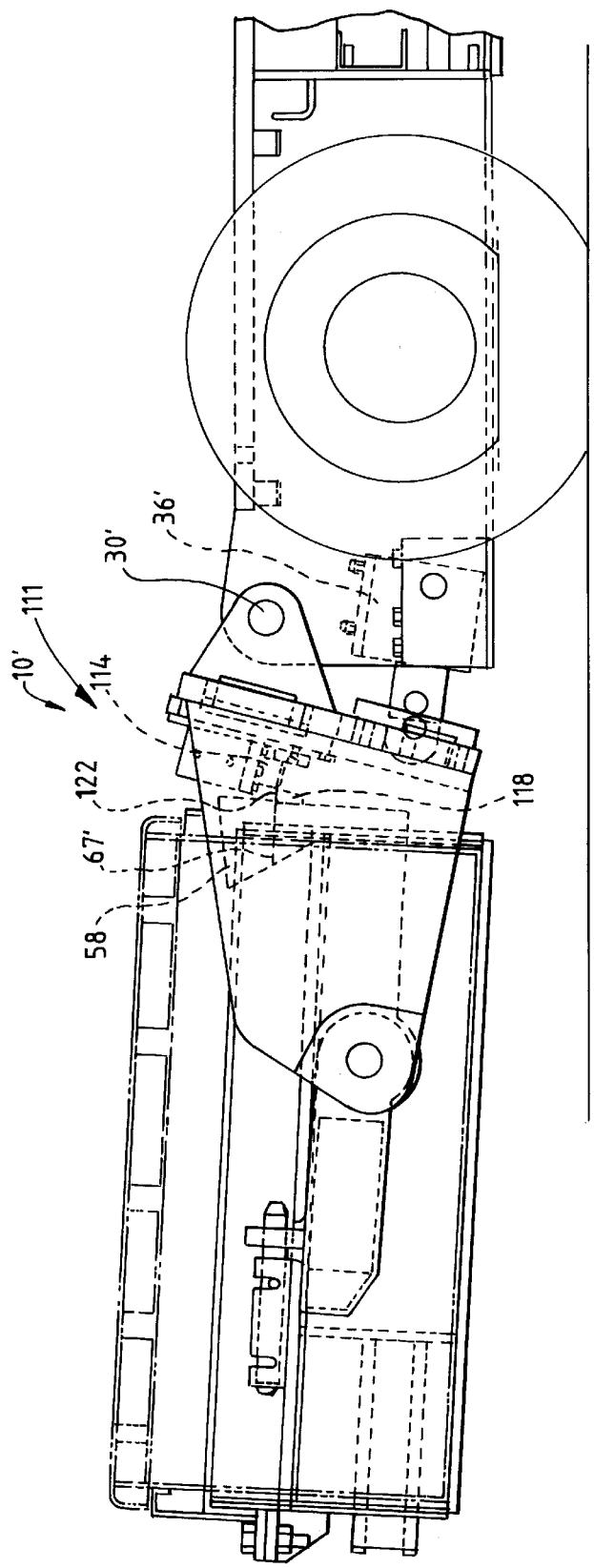
FIG. 14 is a side elevational view of the invention of FIG. 12 illustrating the locking device in the unlocked position during an unloading operation.

FIG. 14 discloses the pivoted lifting device 10' in the beginning phase of an unloading operation. The pivot locking device 111 shows the shaft 114 in the unlocked position, out of contact with the shoulder 118. The top surface 67' is shown to be in contact with the stop plate 58'.

FIG. 15 discloses a top plan view of the pivoted lifting device 10' and battery 15'. The pivot locking device 111 of FIGS. 12–14 is shown in the lower portion of FIG. 15. A second pivot locking device 111 is shown in the lower right portion of FIG. 15 and is a mirror image of the first pivot locking device 111.

FIG. 17 is a partial cross section of the cylinder 112 and shows the spring 115 located between a cylinder end wall 130 and a piston 132. The piston 132 is coupled to the cylinder shaft 114. The spring 115 exerts a constant downward force on the piston 132 and shaft 114.

In operation, for loading the battery 15', the hydraulic system (not shown) is activated to move the shafts 114 to the unlocked position. The vehicle 12' then approaches the battery with the pivoted lifting device 10' in the position such as shown in FIG. 1. After the engagement surfaces 44' of the battery lift arms 28 come into complete contact with the engagement area 46' of the battery 15', the hydraulic system (not shown) is deactivated to allow the shafts 114 to move outwardly to the armed position under the force of the spring 115. The hydraulic cylinder 36' is now actuated, to move the battery support arms 24, 26 in an upward direction thereby lifting the battery 15' off the ground surface. With the battery off the ground surface, the battery lift arms 28' begin pivoting due to the uneven weight distribution, with the second ends 128 moving in a downward direction. The battery lift arms 28 will continue pivoting with the upper edges 122 coming into contact with the ends 116 of the shafts 114, such as shown in FIG. 12. The edge 122 will urge the shafts upwardly against the force exerted by the spring 115 of the cylinder 112. The battery lift arms 28' will continue to pivot until the shoulders 118 clear the paths of the shafts 114 whereupon the shafts 114 will be urged back towards the locked position under the spring tension. The pivot locking devices 111 will then be a position similar to that shown in FIG. 13, whereby the battery lift arms 28' will be locked in position between the stop plates 58' and the shafts 114.

The weight of the battery 115 will normally be transmitted via the top surfaces 67' to the stop plates 58', however bouncing of the top surfaces 67' against the stop plate 58' (and the resulting destructive vibrational forces) will be prevented due to the contact surfaces 120 being adjacent the shafts 114. Further, any force exerted on the shafts 114 by the contact surfaces 120 will be directly transmitted to the abutments 124.

At the end of a work shift, the battery may be unloaded by operating the hydraulic system (not shown) to urge the shafts 114 to the unlocked position against the spring tension, such as shown in FIG. 14. It should be noted that the shafts 114 are moved to the unlocked position while the vehicle is not moving, so that the weight of the battery will be against the stop plates 58' and not on the shafts 114.

With the pivot locking devices 111 in the unlocked position, the hydraulic cylinders 36' are again activated to lower the battery support arms 24, 26 until the battery is resting on the ground. The vehicle is then moved away from the battery and is ready to load a charged battery in the sequence outlined above.

It is noted that the pivot rod 30 of FIGS. 1–7 is shown located in a lower portion of the vehicle, whereas the pivot rod 30' of FIGS. 12–16 is shown located in an upper portion of the vehicle. The hydraulic cylinders 36,36' are similarly located in opposite locations. The pivoted lifting device and the pivot locking device may be configured with the pivot rod 30,30' in either configuration, with the hydraulic cylinder 36,36' correspondingly located.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

We claim:

1. A lifting device comprising:
   means for supporting a load to be lifted;
   means for engaging with said load, said engaging means pivotally coupled to said supporting means;
   means for limiting the extent of rotation of said engaging means in one direction, with respect to said supporting means, to define a limit position; and
   means for locking the engaging means at the limit position wherein the locking means includes a wedge slidably secured to the supporting means, the wedge slidable between an unlocked position and a locked or armed position, an abutment secured to the device, a contact surface on the engaging means, the contact surface located a first distance from the abutment at the limit position and located a second distance from the abutment with the engaging means located in a position adjacent to the limit position, the first distance greater than the second distance, and the wedge having a width substantially equal to the first distance, whereby the engaging means is locked in the limit position when the wedge is positioned between the abutment and the contact surface while the engaging means is in the limit position.

2. The lifting device of claim 1, wherein the locking means includes means for controlling the wedge.

3. The lifting device of claim 1, wherein the locking means includes a hydraulic operated cylinder.

4. The lifting device of claim 1, wherein the locking means includes means for urging the wedge in the locked or armed position.

5. A lifting device for carrying a power source, comprising:
   a frame, said frame including a pair of spaced apart support members having one end rotatable about a horizontal axis and another end;

engagement members having an engagement surface, said engagement members having a mid-section pivotally connected to said other end of said support members and freely rotatable relative to said support members, said engagement members each include a first end and a second end;

means for limiting the extent of rotation of said engagement members in one direction, with respect to said support members, to define a limit position; and means for locking the engagement members at the limit position, said locking means includes a shaft movably secured to said frame, said shaft movable from an unlocked position to a locked or armed position, the shaft in the unlocked position is retracted out of the path of the first end of one of the engagement members, and in the locked position, the shaft is extended in the path of the first end of the one engagement member.

6. The locking device of claim 5, wherein the shaft in the locked position is adjacent the first end of said one engagement member in the limit position, whereby movement of the one first end from the limit position is blocked by the shaft.

7. The locking device of claim 6, further comprising a contact surface on said one first end, the contact surface facing the shaft in the limit position and with the shaft in the locked position.

8. The lifting device of claim 5, wherein said locking means further comprises:

a cylinder, the shaft coupled to the cylinder;

means for biasing the shaft in the locked or armed position; and hydraulic actuable means for urging the shaft against said biasing means to the unlocked position.

9. The lifting device of claim 8, wherein the biasing means includes a spring.

10. The lifting device of claim 8, further comprising a downward facing end on the shaft; and an edge located on one of the first ends and adjacent a contact surface, the edge facing substantially upwards and the shaft in the locked or armed position is located in the path of the edge as the one first end pivots toward the limit position, whereby the edge contacts the end and urges the shaft against the biasing means and away from the armed position as the one first end approached the limit position, and the edge clears the path of the shaft upon reaching the limit position, with the shaft returning to the armed position under the action of the biasing means and engaging the contact surface.

11. The lifting device of claim 5, further comprising an abutment located on the frame, the abutment located adjacent the shaft, with the shaft in the locked or armed position, and opposite from the one first end in the limit position, whereby any force exerted by the one first end on the shaft is transmitted to the abutment.

12. A battery changing system and electric battery powered vehicle, comprising:

a support frame, said frame including spaced apart battery support members hingedly connected about a horizontal axis to said vehicle;

means for selectively pivoting said support frame about said horizontal axis between an upright vehicle operating position and a downwardly angled loading and unloading position;

a pair of battery engagement arms for engaging the battery, said pair of battery engagement arms each having a midsection pivotally mounted to a respective battery support member, the battery engagement arms having a first end and a second end, the second ends extend away from the frame, the engagement arms having a rotating moment to encourage the engagement arms to pivot in a predetermined direction to cause the second ends to move in a downward direction;

a first stop plate secured to the support frame for limiting the extent of rotation of said battery engagement arms, with respect to said battery support members, to define a limit position;

a first abutement secured to said support frame; and a first shaft movably secured to said frame, said shaft movable from an unlocked position to a locked or armed position substantially in contact with and between one of said battery engagement arms and said first abutement.

13. The battery changing system and electric battery powered vehicle of claim 12, further comprising:

said shaft extends from a cylinder and includes an end facing substantially in a downward direction, the cylinder having means for biasing the shaft in the locked or armed position, and actuable hydraulic means for forcing the shaft against the biasing means and to the unlocked position; and a shoulder on said first end of one of said battery engagement arms, said shoulder having a contact surface facing away from said mid-section and inclined away from the midsection in the predetermined pivoting direction of the battery engagement arms, said contact surface in engagement with said shaft with the shaft in the locked or armed position and the engagement arms in the limit position, said shoulder having an edge facing substantially upwards and located adjacent said contact surface, whereby with the battery engagement arms pivoting in the predetermined direction and prior to the engagement with the stop plate, the upward facing edge engages the end of the shaft forcing the shaft upwards towards the unlocked position, until the upward facing edge clears the path of the shaft and the battery engagement arms engage the stop plate, wherein the shaft is urged by the biasing means back to the locked position.

14. The battery changing system and electric battery powered vehicle of claim 12, further comprising:

a further abutement secured to the support frame;

a further shoulder on said first end of the other of said battery engagement arms; and a second cylindrical shaft movably secured to said frame, said shaft movable from an unlocked position to a locked or armed position substantially in contact with and between the further shoulder and said further abutement.

* * * * *